Patented Jan. 13, 1925.

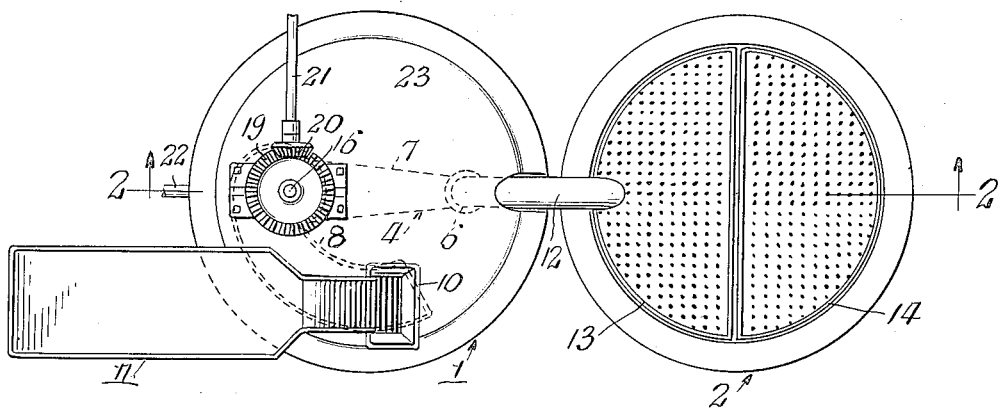
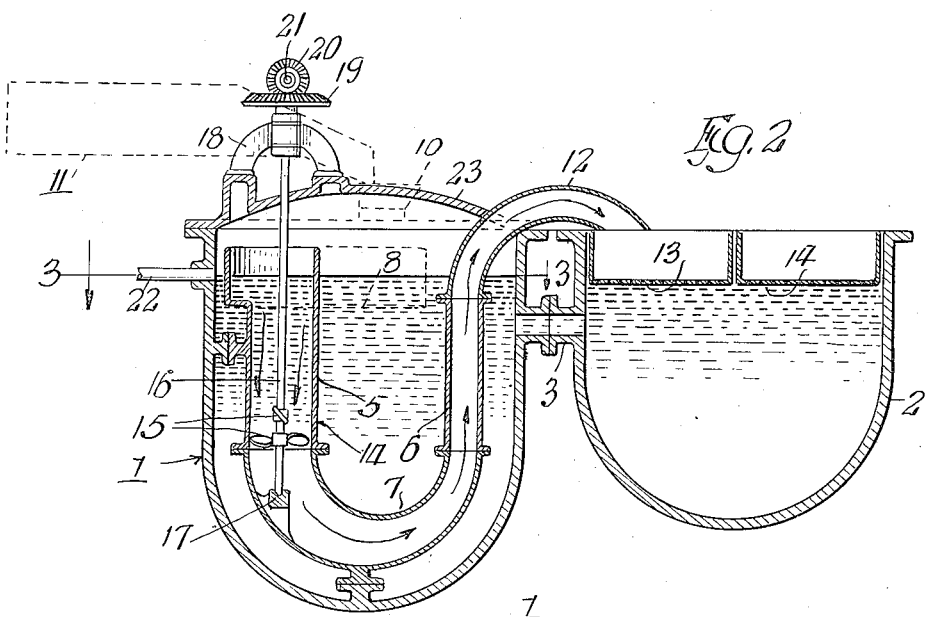
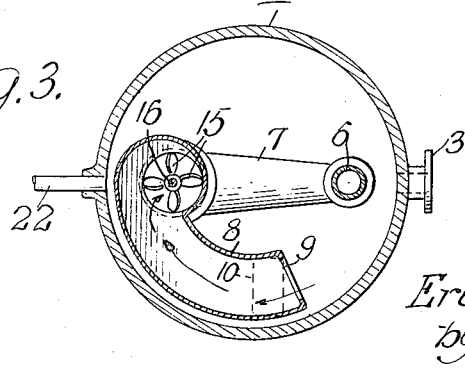

1,522,765

UNITED STATES PATENT OFFICE.

ERWIN L. WILKE, OF HAMMOND, INDIANA, ASSIGNOR TO METALS REFINING COMPANY, OF HAMMOND, INDIANA, A CORPORATION OF INDIANA.

APPARATUS FOR MELTING SCRAP METAL.

Original application filed December 4, 1922, Serial No. 604,663. Divided and this application filed February 20, 1924. Serial No. 693,952.

*To all whom it may concern:*

Be it known that I, ERWIN L. WILKE, a citizen of the United States, residing at Hammond, in the county of Lake and State of Indiana, have invented new and useful Improvements in Apparatus for Melting Scrap Metal, of which the following is a specification.

This invention relates to an apparatus for melting scrap metal by a method disclosed in my copending application Serial No. 604,663, filed December 4, 1922, and of which the present application is a division.

This invention has particular reference to melting scrap battery plates, and consists in the novel form of apparatus hereinafter described and more particularly set forth in the appended claims.

In the accompanying drawings—

Fig. 1 is a top plan view of the apparatus carrying out the method of my invention;

Fig. 2 is a vertical longitudinal sectional view taken on line 2—2 of Fig. 1; and Fig. 3 is a horizontal sectional view taken on line 3—3 of Fig. 2.

The apparatus shown in the drawings has two crucibles or pots 1, 2, preferably arranged close together and designed to contain molten metal of the kind used for the scrap being handled. When melting scrap battery plates, the pots contain molten antimonial lead. Said pots 1, 2 are connected together adjacent their upper ends by a conduit 3, so that the level in both will be substantially the same. Any suitable form of means may be employed for heating the pots to keep the metal therein in a molten condition.

Submerged in the pot 1 is a conduit 4 substantially U-shape in form when the device is as shown in the drawings. This provides the conduit with vertical inlet and outlet sections 5, 6, respectively, and a connecting bottom section 7. The section 5 opens at its upper end into a horizontally arranged trough 8 curved in an arc of a circle concentric to that of the pot 1 and projecting above the level of the molten metal therein. Said trough 8 extends more than 90° from its entrance into the conduit section 5 and at its outer end has an inlet 9 submerged in the molten metal to allow the same to flow through from the pot into the conduit through the trough.

To feed the scrap metal being handled into the trough 8, I provide a hopper 10 arranged to discharge into the trough adjacent its inlet 9. This hopper, in the particular form of apparatus shown, has a feed table 11 associated with it.

The conduit section 6 has its upper end connected with a discharge section or spout 12, which extends above the pot 1 and over the same to the pot 2. The spout 12 discharges into the pot 2 through baskets 13, 14. These have foraminated or perforated bottoms, as shown, to allow the molten metal discharged therein to drain into the pot 2. The purpose of the baskets will be presently mentioned.

Molten metal is caused to flow through the conduit 4 from the pot 1 by one or more impellers 15 arranged in the conduit 4 on a vertical shaft 16. This shaft has a stepped bearing at 17 in the conduit section 7 and extends upward out of the section 5 and above the trough 8, as shown. The upper end of said shaft 16 is journaled in a standard 18 and carries a beveled gear 19. This is in mesh with a beveled pinion 20 on a shaft 21, whereby power may be imparted to the shaft 16 for rotating the impellers 15. The impellers 15 are located below the inlet end of the section 5 with the trough 8, and the action of the device is to draw a stream of molten metal from the pot 1 into the conduit 4 and discharge it into the pot 2 through the spout 12.

Scrap metal is fed into the trough 8 at a point spaced from the conduit section 5 and is thus introduced into the stream of molten metal before the latter reaches the vortex at the inlet into said sections. This allows the moving stream or mass of molten metal to completely submerge and surround the introduced scrap before the latter reaches the conduit 4 and thus be substantially if not completely melted before moving into the conduit. During the passage through the conduit, any unmelted scrap will be entirely melted before the stream is discharged into the pot 2 as the conduit is heated by the molten metal in the pot 1.

Any material in the mixture which is not melted will be collected by the baskets 13, 14 as dross. Said baskets are made semicircular in shape and float on the molten metal in the pot 2. When one basket becomes filled with dross, the empty one is turned under the spout 12, and the filled one is removed and emptied. The pot 1 has an overflow pipe 22 to carry off the metal recovered by the process, and there is a cover 23 for said pot.

My invention is particularly applicable for melting scrap battery plates. The metal body of these plates is an alloy of lead and antimony. These plates are covered with what is termed "paste," which contains lead oxid. It is the design of my invention to melt the antimonial lead forming the body of these plates, and to do this the molten metal in the pots 1 and 2 is lead of the same kind. The "paste" will not melt during the process and that is collected as dross in the baskets 13 and 14. The latter may be refined for obtaining the metallic lead therefrom.

Introducing the scrap metal into a moving stream of molten metal allows the heat of the larger mass to be given off more rapidly to the smaller mass of scrap and more quickly melt the latter. Moreover, the moving stream of molten metal carries the scrap as introduced away from the place of introduction, so that there is no accumulation of scrap metal in the stream to prevent a complete immersion and surrounding of the scrap with molten metal. Melting the scrap in this way does it quickly, in that the molten metal has a chance to completely surround the scrap and give off its heat with much more rapidity than should the scrap be thrown on top of a relatively passive mass of molten metal and be allowed to melt by a gradual immersion, or in cases where large batches of scrap are thrown into a passive mass of molten metal and allowed to melt, because in that case the particles of scrap lie one against the other and prevent the rapid immersion of the scrap on all sides by the molten metal.

While I have described herein an apparatus of my invention for melting antimonial lead as contained in scrap battery plates, it is of course to be understood that my invention is applicable to melting scrap of other metal, and I do not wish to be restricted to any particular use except as may be limited by the annexed claims. Moreover, the term "conduit" used in the claims includes the entire conduit from the inlet of the trough 8 to the outlet of the discharge spout 12, unless otherwise indicated. In this connection, the inlet of the conduit is at the inlet of the trough 8. Where the latter opens in the conduit section 5, the trough walls are given somewhat spiral form with respect to the section inlet in order to provide a swirl of molten metal at the vortex and thus insure proper agitation of the mixture to completely submerge and separate all scrap parts that may tend to cling together.

I claim as my invention:

1. An apparatus of the character described, comprising a pot to contain molten metal, a conduit in said pot and having inlet and discharge openings, the former being in said pot below the level of the molten metal therein, and the latter being outside of said pot, means causing the molten metal to flow through said conduit from said pot, and means at the inlet end of said conduit for introducing scrap metal into the same.

2. An apparatus of the character described, comprising a pot to contain molten metal, a conduit submerged in said pot and having inlet and discharge openings, the former being in said pot below the level of the molten metal therein, and the latter being outside said pot and above the same, a trough in the molten metal in said pot at the inlet to said conduit and opening into the same, said trough having an inlet opening at a point spaced from the entrance of the conduit into the same, the inlet opening of the trough being below the level of the molten metal, means in the conduit for causing the molten metal to flow through the same from said trough, and means at said trough for discharging scrap metal into the same.

3. An apparatus of the character described, comprising two pots in spaced relation and connected to have the same level of molten metal therein, a conduit submerged in one pot and having its discharge end over the other pot, said conduit having its inlet in the first pot and below the level of molten metal therein, means for causing the molten metal to flow through the conduit from the first pot and be discharged into the second pot, means at the inlet of the conduit to receive scrap metal and introduce the same into the stream of molten metal in the conduit, and means in the other pot under the discharge end of said conduit to receive the mixture and separate the dross therefrom.

4. An apparatus of the character described, comprising two pots in spaced relation and being connected to have substantially the same level of molten metal therein, a conduit submerged in one pot and having its discharge end over the other pot, said conduit having its inlet in the first pot and below the level of the molten metal therein, means in the conduit for causing the molten metal to flow therethrough from the first pot and be discharged into the second pot, means at the inlet end of the conduit to receive the scrap metal and introduce the same into the stream of molten metal in the conduit, and two semicircular baskets floating on the metal in the second pot for collecting the dross from the molten metal discharged from said conduit.

5. An apparatus of the character described, comprising a pot to contain molten metal, a conduit submerged in said pot and having inlet and discharge openings, the former being in said pot below the level of the molten metal therein, and the latter being outside said pot and above the same, a trough in the molten metal in said pot at the inlet end of said conduit and opening into the same in a manner to cause the molten metal to enter said conduit in a swirl, said trough having an inlet opening at a point spaced from the conduit and below the level of the molten metal, means in the conduit for causing the molten metal to flow through the same from said trough, and means for discharging scrap metal into the trough.

6. An apparatus of the character described, comprising two pots in spaced relation and connected to have the same level of molten metal therein, a conduit submerged in one pot and having its discharge end over the other pot, said conduit having its inlet in the first pot and below the level of molten metal therein, means for causing the molten metal to flow through the conduit from the first pot and be discharged into the second pot, means at the inlet of the conduit to receive scrap metal and introduce the same into the stream of molten metal in the conduit, means in the other pot under the discharge end of said conduit to receive the mixture and separate the dross therefrom, and an overflow pipe connected with one pot to remove the metal recovered by the apparatus.

7. An apparatus for melting scrap metal, comprising a conduit for carrying a stream of molten metal, and means for introducing scrap metal into said conduit, the latter being arranged for moving the stream of molten metal in a predetermined direction away from the place of introduction of the scrap.

8. An apparatus for melting scrap metal, comprising a conduit for carrying a moving stream of molten metal, means adjacent one end of the conduit for introducing scrap into the stream of molten metal therein, and means at the other end of the conduit for separating the melted from the non-melted material.

9. An apparatus for melting scrap metal, comprising a pot to contain molten metal, a conduit submerged in said pot and having inlet and discharge openings, the former being in said pot below the level of the molten metal therein and the latter being outside of said pot, means causing the molten metal to create a vortex on entering the conduit from said pot, and means for discharging the scrap metal into the pot to be preheated before entering the conduit at said vortex.

10. An apparatus for melting scrap metal, comprising a pot to contain molten metal, a conduit submerged in said pot and having inlet and discharge openings, the former being in said pot below the level of the molten metal therein and the latter being outside of said pot above the same, means in the conduit for aiding the flow of molten metal therethrough from the pot, means at the inlet end of the conduit causing the molten metal entering the same to take a circular path and creating a vortex at the inlet of the conduit, and means for discharging the scrap metal into the pot to preheat the scrap metal before entering the conduit at said vortex.

In testimony that I claim the foregoing as my invention, I affix my signature this 15th day of February, 1924.

ERWIN L. WILKE.